US009917775B2

(12) United States Patent
Mulka et al.

(10) Patent No.: US 9,917,775 B2
(45) Date of Patent: Mar. 13, 2018

(54) INTELLIGENT DEVICES IN A SOFTWARE-DEFINED NETWORK

(71) Applicant: McAfee, LLC, Plano, TX (US)

(72) Inventors: Shivakrishna Anandam Mulka, Bangalore (IN); Jayakrishnan Nair, Bangalore (IN)

(73) Assignee: McAfee, LLC, Plano, TX (US)

( * ) Notice: Subject to any disclaimer, the term of this patent is extended or adjusted under 35 U.S.C. 154(b) by 4 days.

(21) Appl. No.: 14/978,604

(22) Filed: Dec. 22, 2015

(65) Prior Publication Data

US 2017/0180237 A1    Jun. 22, 2017

(51) Int. Cl.
*H04L 1/00* (2006.01)
*H04L 12/741* (2013.01)
*H04L 12/721* (2013.01)
*H04L 12/26* (2006.01)

(52) U.S. Cl.
CPC ............ *H04L 45/745* (2013.01); *H04L 43/10* (2013.01); *H04L 45/26* (2013.01)

(58) Field of Classification Search
CPC ... H04L 12/46; H04L 12/462; H04L 12/4625; H04L 12/66; H04L 2012/5618; H04L 29/06095; H04L 29/0653; H04L 45/74; H04L 49/3009; H04L 49/309; H04L 41/04; H04L 41/085; H04L 41/12; H04L 45/02; H04W 84/18
USPC ................ 370/248, 254, 392, 401, 252, 253
See application file for complete search history.

(56) References Cited

U.S. PATENT DOCUMENTS

| 5,987,610 | A | 11/1999 | Franczek et al. |
|---|---|---|---|
| 6,073,142 | A | 6/2000 | Geiger et al. |
| 6,460,050 | B1 | 10/2002 | Pace et al. |
| 7,506,155 | B1 | 3/2009 | Stewart et al. |
| 2015/0043589 | A1 | 2/2015 | Han et al. |
| 2015/0281036 | A1* | 10/2015 | Sun ..................... H04L 43/0829 370/248 |

(Continued)

FOREIGN PATENT DOCUMENTS

| WO | 2015169176 A1 | 11/2015 |
|---|---|---|
| WO | 2017112154 A1 | 6/2017 |

OTHER PUBLICATIONS

International Search Report and Written Opinion issued in PCT Application No. PCT/US2016/062390 dated Feb. 17, 2017; 10 pages.

*Primary Examiner* — Dady Chery
(74) *Attorney, Agent, or Firm* — Patent Capital Group

(57) ABSTRACT

There is disclosed a network device having a network interface; and one or more logic elements comprising a flow table engine operable to: receive a network packet via the network interface; perform a logging action to make the network packet traceable; and notify a software-defined networking (SDN) controller of the logging action via the network interface. There is also disclosed an SDN controller having a network interface; first one or more logic elements comprising a software-defined networking (SDN) controller engine to provide SDN controller services; and second one or more logic elements comprising a route tracing engine, operable to: receive a logging action for a network packet from a network device via the network interface; and update a logging table from the logging action. There is further disclosed a method of providing the foregoing, and computer-readable mediums for providing the foregoing.

25 Claims, 9 Drawing Sheets

(56) References Cited

U.S. PATENT DOCUMENTS

2015/0312142 A1  10/2015  Barabash et al.
2015/0326526 A1  11/2015  Zeng et al.

* cited by examiner

INTELLIGENT DEVICES IN A SOFTWARE-DEFINED NETWORK

FIELD OF THE SPECIFICATION

This disclosure relates in general to the field of computer networking, and more particularly, though not exclusively to, a system and method for intelligent devices in a software-defined network.

BACKGROUND

Software-defined networking (SDN) is an approach to computer networking that allows network administrators to manage network services through abstraction of higher-level functionality. This is done by decoupling the system that makes decisions about where traffic is sent (the control plane) from the underlying systems that forward traffic to the selected destination (the data plane). SDN may require a method for the control plane to communicate with the data plane.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
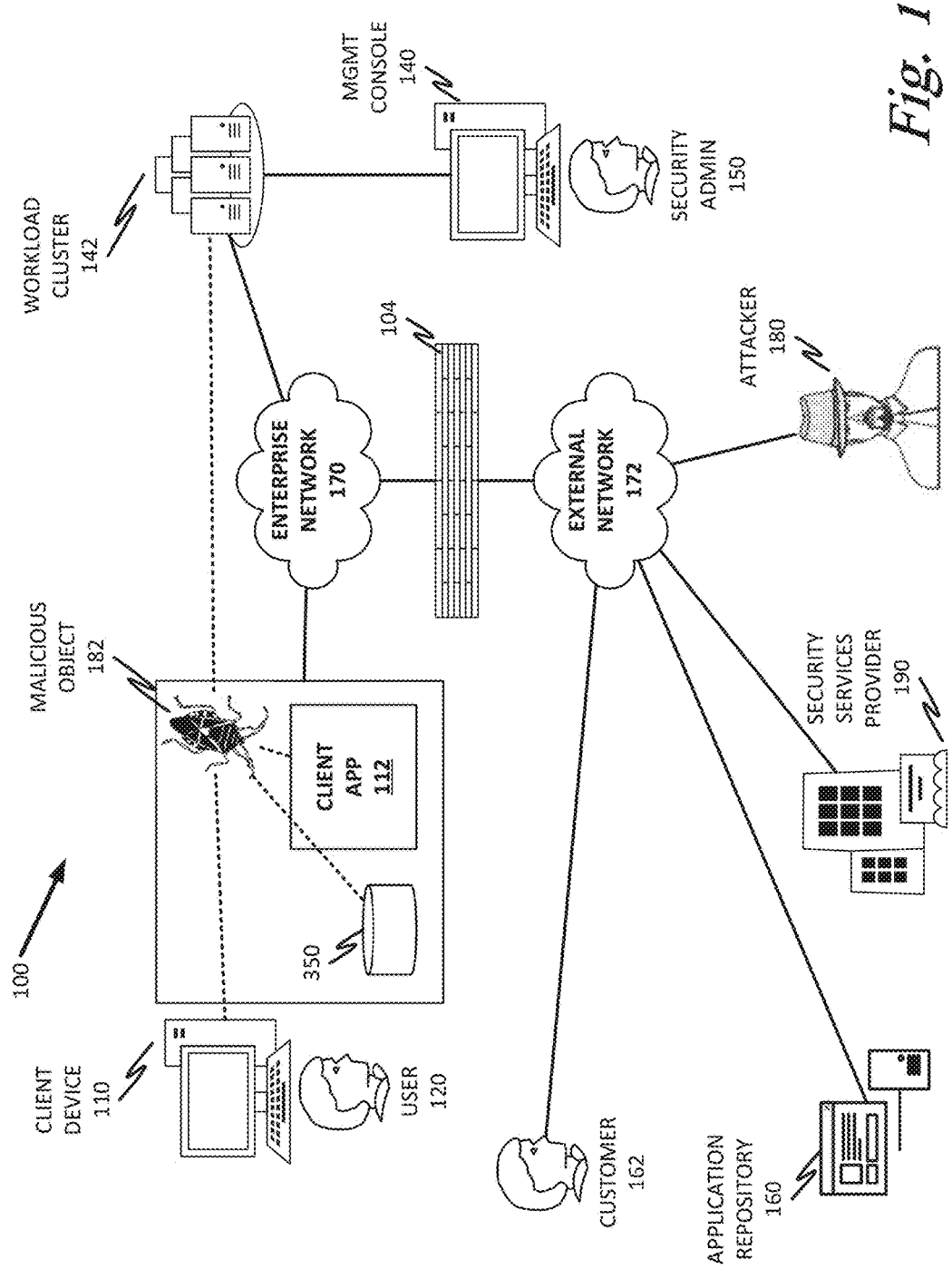
FIG. 1 is a block diagram of a security-enabled network according to one or more examples of the present specification.

There is disclosed a network device having a network interface; and one or more logic elements comprising a flow table engine operable to: receive a network packet via the network interface; perform a logging action to make the network packet traceable; and notify a software-defined networking (SDN) controller of the logging action via the network interface. There is also disclosed an SDN controller having a network interface; first one or more logic elements comprising a software-defined networking (SDN) controller engine to provide SDN controller services; and second one or more logic elements comprising a route tracing engine, operable to: receive a logging action for a network packet from a network device via the network interface; and update a logging table from the logging action. There is further disclosed a method of providing the foregoing, and computer-readable mediums for providing the foregoing.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In certain software defined data centers, network devices may lack the intelligence to adequately inform SDN controllers of their role within the network, particularly as it relates to a specific packet. In contrast, older hardware-only networks included physical service appliances in a physical service chain. Because each service appliance connected to a physical network port, a trace route command could easily track the path that a packet traversed over the network.

However, in a modern network where many or all network functions are virtualized, there may not be a physical network path to trace through. Thus, it is desirable to provide a system and method for reliably tracing the virtual path of a data packet through the network. This may provide features such as:

a. Blocking malicious traffic at the source network device instead of at a security appliance. In other words, if a network packet is found to be malicious, the SDN controller can identify the source device, and more efficiently blocked traffic from that device.

b. The SDN may also need to know the end-to-end the path for a particular flow, including which network devices the flow passes through.

c. Identifying a specific network device that stopped a flow from reaching its intended destination or host.

Advantageously, the present specification provides systems and methods for providing reliable traceroute information for network flows and packets. An example method includes the following:

a. Add a one-bit "role tag" field, whose value is set once for a packet arriving at a source network device. The source network device informs the SDN controller of its role as the source (S) for this packet.

b. If the packet arriving at a network device already has a role tag set and the network device is not the source network device for the packet, and also not the destination device for the packet, then ignore the role tag field and inform the SDN Controller that this network device as Intermediate (I) network device.

c. If the packet arriving at a network device has the role tag field set to one, and the network device is the destination device for this packet, remove or clear the role tag field and inform the SDN controller that this network devices role is destination (D) for this packet.

d. If no role tag is set in the packet and there is an entry in the source network device for this packet, packets are forwarded as per the flow rules and statistics are updated to SDN Controller. Packets with no role tag received at all other network devices are forwarded as per flow rules.

This method ensures that the centralized control of any software defined data center knows the source and destination network devices, and intermediate network devices, of each packet and flow.

In another embodiment, which may be used in addition to, in conjunction with, or instead of the role tag method disclosed above, the SDN controller may install flow rules as follows:

| Ingress I/F | Source MAC | Dest. MAC | Source IP | Dest. IP | Action |
|---|---|---|---|---|---|
| P1 | ANY | ANY | ANY | 10.0.0.30 | P2 |

This flow rule may be considered a "wildcard" rule, because multiple packets from any source destined for 10.0.0.30 can match the flow rule, and thus be forwarded to that destination per this rule.

In this case, it may not be optimal to keep, locally on every device, a routing table covering every single network packet that traverses the network device. Such a table could quickly grow very large, and could overwhelm the network device, especially in a large enterprise environment, where millions of packets may traverse the network device in a day. Thus, while this kind of flow rule is very efficient, it may prevent an SDN controller from knowing specifically a flow or a packet's statistics.

However, the network devices themselves may be modified to provide useful data to the SDN controller. Similar to the example method illustrated above, each network device may provide a minimal notification to the SDN controller, and the SDN controller may use that information to infer the necessary information.

This method may comprise the following, by way of example:
a. Each network device may be configured to inform the SDN controller of the role of the device, including for example, packet header, network device id and input interface.
b. Either before or after notifying the SDN controller, the network device performs a lookup in the flow rule table.
c. The SDN controller constructs a path of network devices as a packet passes through the network by constructing a flow path table using the role of network device notifications sent out by network devices.
d. A timeout value may be set for each flow at its respective source network device, so that if no matching packets are received within the timeout, the flow table entry is purged. This can prevent the table from becoming unmanageably large.

Using this method, the following can be achieved:
a. An end-to-end path for each packet can be derived, including network devices that the packet traversed.
b. Packet flow statistics, such as the number of packets, can be retrieved from the SDN controller on a request from a network device.
c. The SDN controller or another network device can determine which network device dropped a particular packet if the packet did not reach its destination device. This may help to identify faulty devices, or to determine where a packet was dropped because it was deemed malicious or flawed.
d. The SDN controller or a security appliance can block malicious traffic at the source network device, instead of at a downstream security appliance. Thus, the SDN controller can intelligently handle malicious events from security appliances.

A system and method for providing intelligent devices in a software-defined network will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In this example, secured enterprise 100 may be configured to provide services or data to one or more customers 162, who may access information or services via external network 172. This may require secured enterprise 100 to at least partly expose certain services and networks to the outside world, thus creating a logical security aperture. Note that secured enterprise 100 of this FIGURE and software-defined network 400 of FIG. 4 may be the same network, shown in different logical arrangements to illustrate various aspects of the network.

Within secured enterprise, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs. In various examples, workload cluster 142 may provide some or all of the functions of network devices 430, hosts 410, or SDN controller 410 of FIG. 4, or firewall 500 of FIG. 5.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
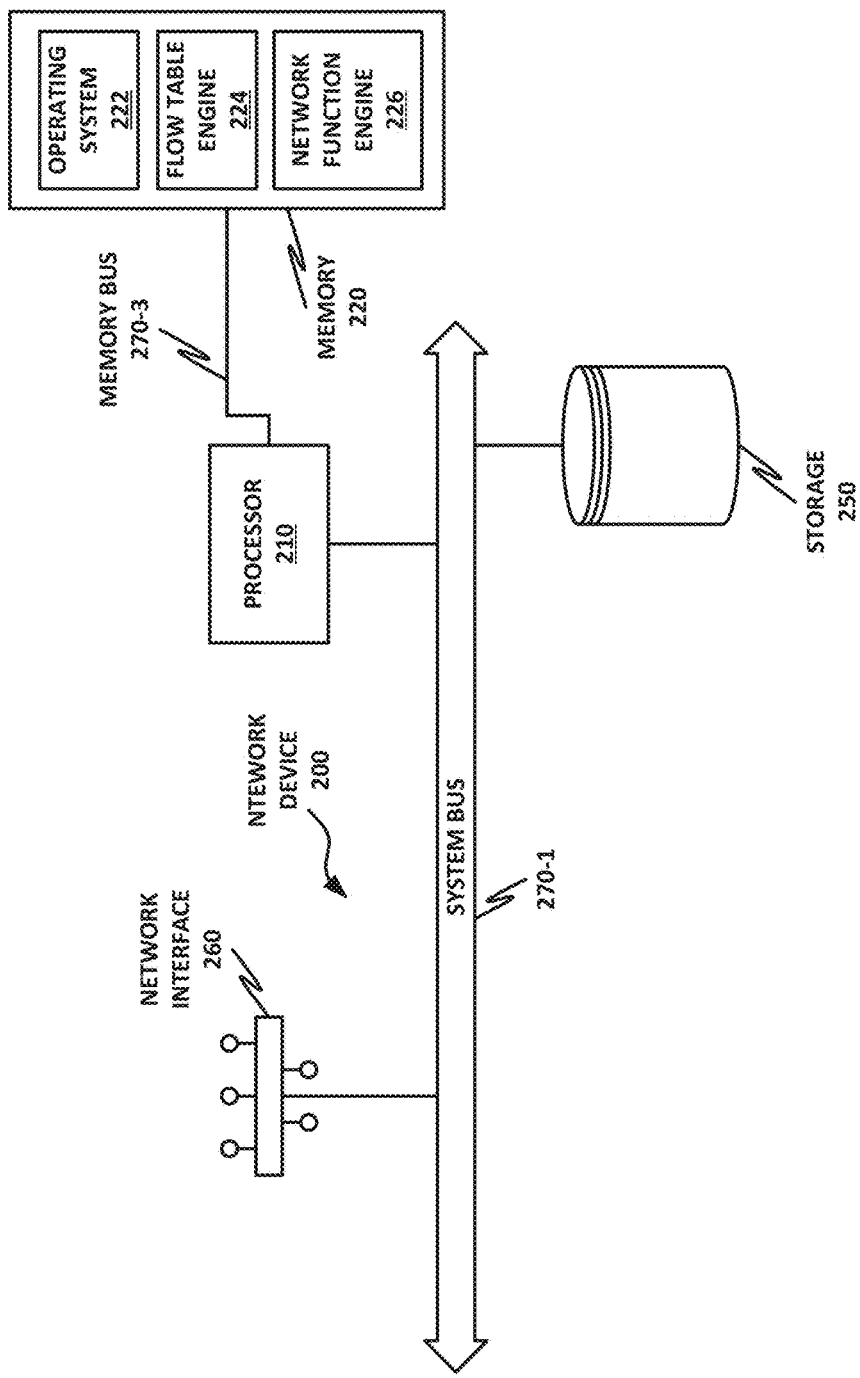
FIG. 2 is a block diagram of a computing device according to one or more examples of the present specification.

FIG. 2 is a block diagram of network device 200 according to one or more examples of the present specification. Network device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In a particular example, network devices 430 of FIG. 4 may all be examples or embodiments of network device 200 disclosed herein.

Network device 200 includes a processor 210 connected to a memory 220, having stored therein executable instructions for providing an operating system 222 and at least software portions of a flow table engine 224. Other components of network device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of flow table engine 224. Many other configurations are also possible, and are intended to be encompassed within the broad scope of this specification.

Network interface 260 may be provided to communicatively couple network device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Flow table engine 224, in one example, is operable to carry out computer-implemented methods as described in this specification. Flow table engine 224 may include one or more tangible non-transitory computer-readable mediums having stored thereon executable instructions operable to instruct a processor to provide a flow table engine 224. As used throughout this specification, an "engine" includes any combination of one or more logic elements, of similar or dissimilar species, operable for and configured to perform one or more methods provided by the engine. Thus, flow table engine 224 may comprise one or more logic elements configured to provide methods as disclosed in this specification. In some cases, flow table engine 224 may include a special integrated circuit designed to carry out a method or a part thereof, and may also include software instructions operable to instruct a processor to perform the method. In some cases, flow table engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that flow table engine 224 may also include other hardware and software, including configuration files, registry entries, and interactive or user-mode software by way of nonlimiting example.

In one example, flow table engine 224 includes executable instructions stored on a non-transitory medium operable to perform a method according to this specification. At an appropriate time, such as upon booting network device 200 or upon a command from operating system 222 or a user 120, processor 210 may retrieve a copy of the instructions from storage 250 and load it into memory 220. Processor 210 may then iteratively execute the instructions of flow table engine 224 to provide the desired method.

Figure 6A:
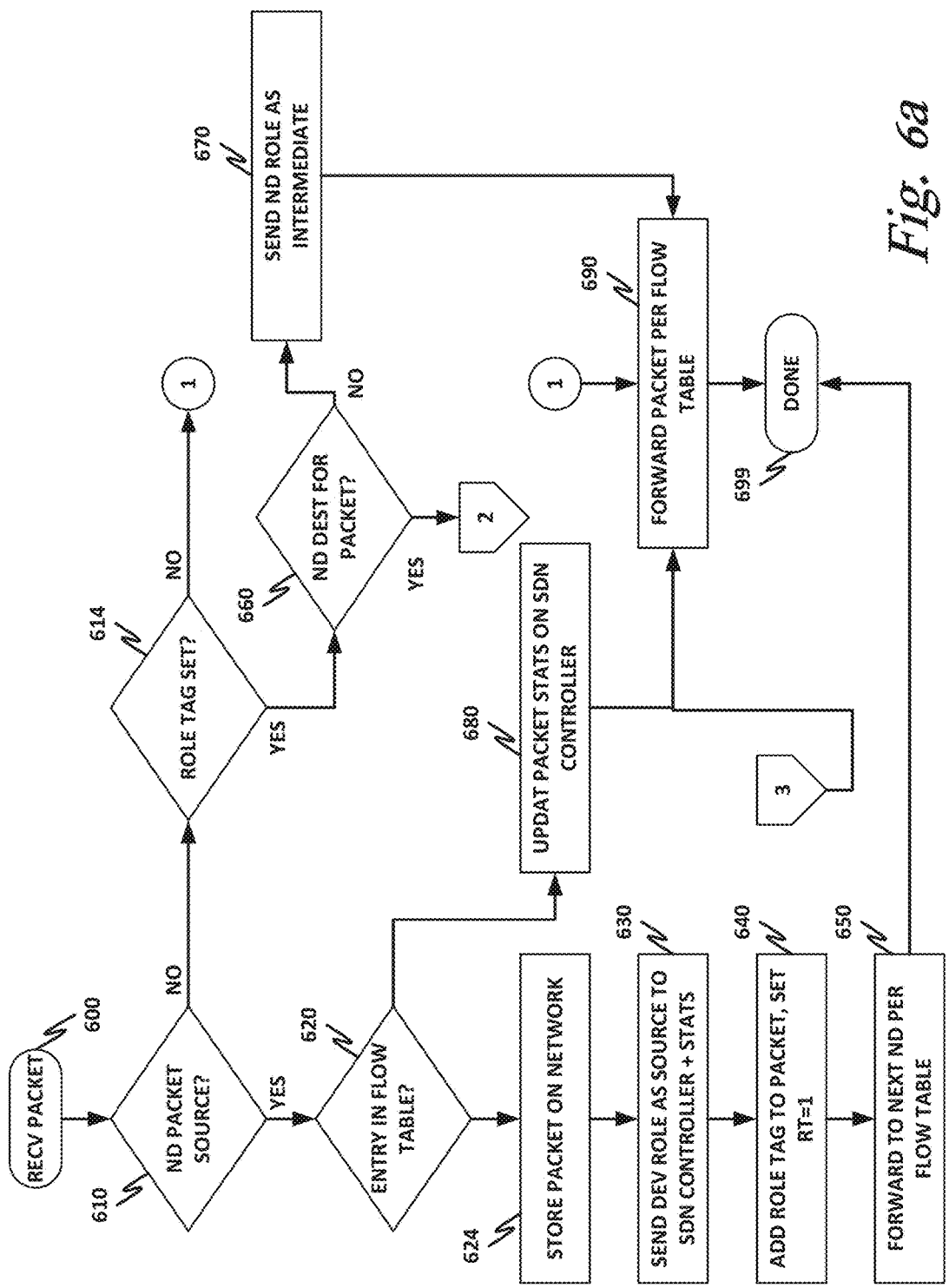
FIGS. 6a and 6b are a flow chart of a method performed by a network device according to one or more examples of the present specification.
Figure 6B:
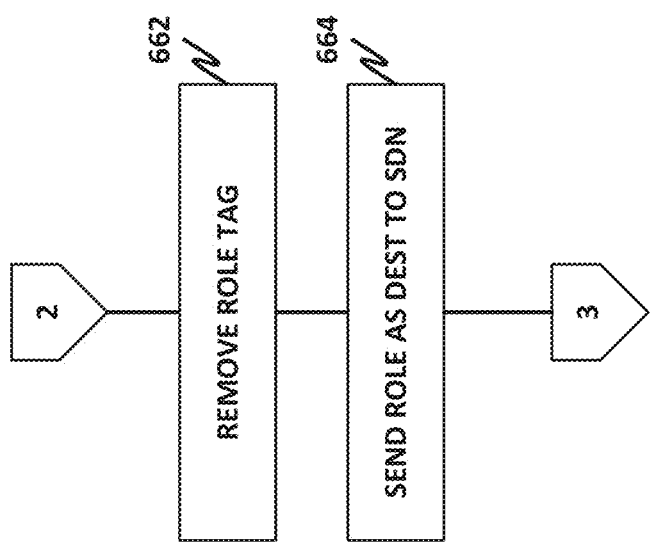
Figure 7:
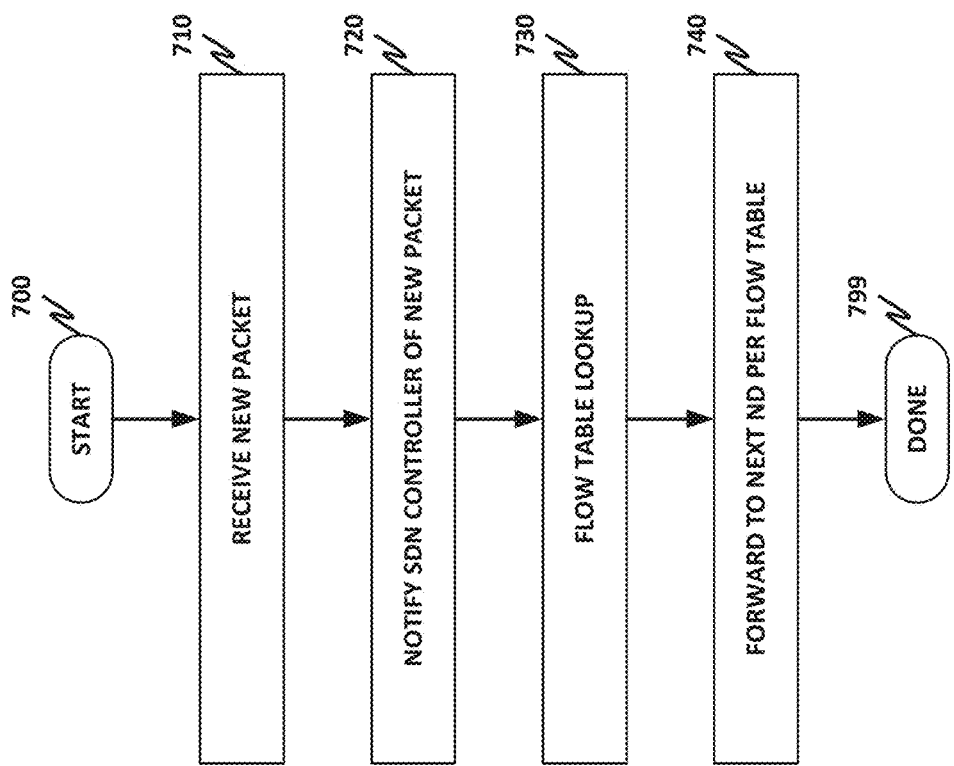
FIG. 7 is a flow chart of a method performed by a network device according to one or more examples of the present specification.

Flow table engine 224 may be configured to manage flow tables as illustrated herein, and in one particular embodiment may carry out the method of FIGS. 6a and 6b, FIG. 7, or any other suitable method. In an example, the role of flow table engine 224 is to help provide route traceability for network traffic.

Network device 200 may also include a network function engine 226. Network function engine 226 is an engine as explained in this specification, and may enable network device 200 to perform any suitable network function. There are a large number of known network functions that can be provided in an appliance, or in a network virtual machine via Network Function Virtualization (NFV). Antivirus, antimalware, deep packet inspection, network address translation, domain name service, caching, and firewalling are several nonlimiting examples. Thus, network function engine 226 provides the hardware and software necessary for a network device to perform its network function, whether it is a physical appliance, a virtual machine, or any other suitable configuration.

Figure 3:
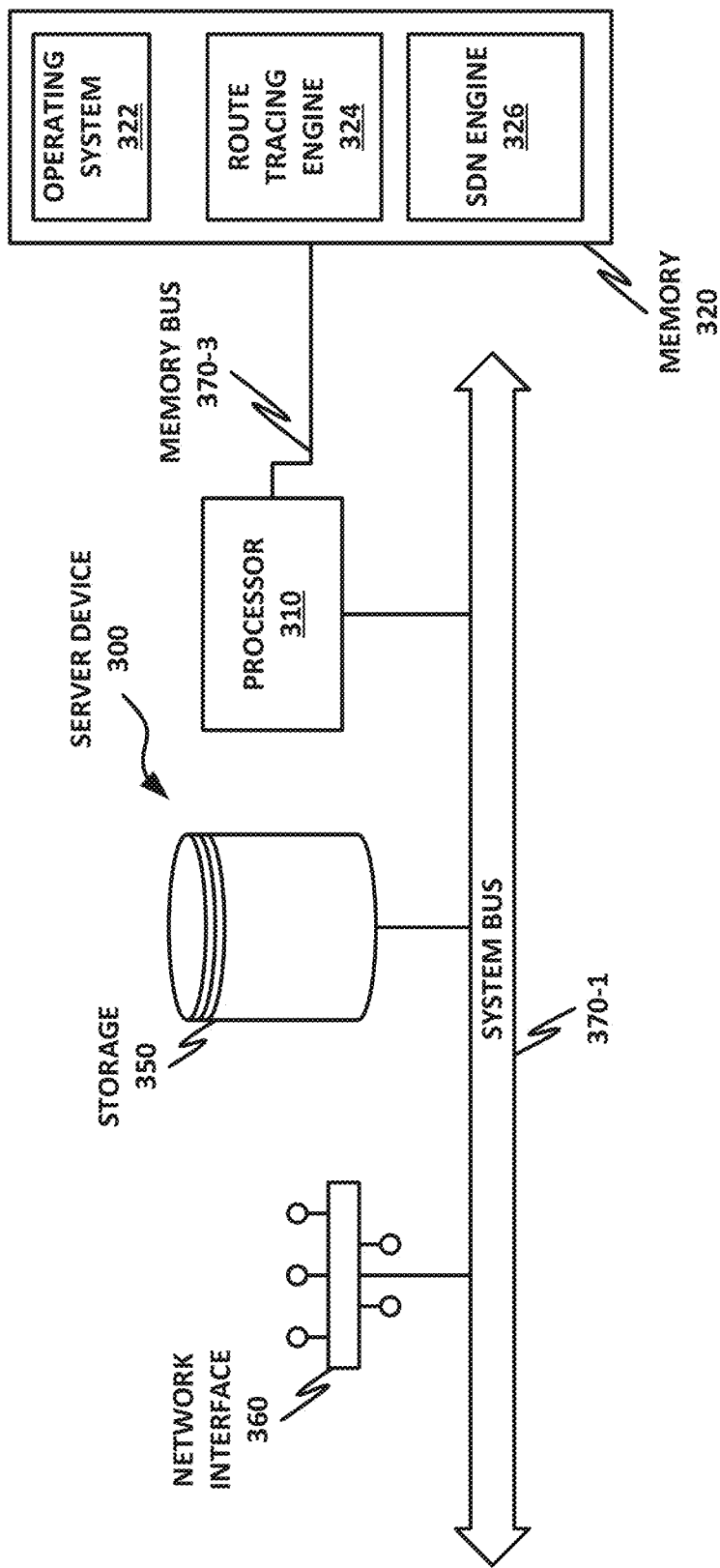
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein network device 200 provides certain localized tasks, while server 300 provides certain other centralized tasks. In contemporary practice, server 300 is more likely than network device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a route tracing engine 324. Other components of server 300 include a storage 350, network interface 360, and peripheral interface 340. As described in FIG. 2, each logical block may be provided by one or more similar or dissimilar logic elements. SDN controller 410 of FIG. 4 may be a server device 300, as well as other devices in workload cluster 142. Note that SDN controller 410 may be instantiated as a virtual machine or appliance within workload cluster 142, or may be a standalone device, as suitable to particular configurations.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of route tracing engine 324.

Network interface 360 may be provided to communicatively couple server 140 to a wired or wireless network, and may include one or more logic elements as described in FIG. 2.

Route tracing engine 324 is an engine as described in FIG. 2 and, in one example, includes one or more logic elements operable to carry out computer-implemented methods as described in this specification. Software portions of route tracing engine 324 may run as a daemon process.

Route tracing engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of route tracing engine 324 (or software portions thereof) from storage 350 and load it into memory 320. Processor 310 may then iteratively execute the instructions of route tracing engine 324 to provide the desired method.

Figure 8:
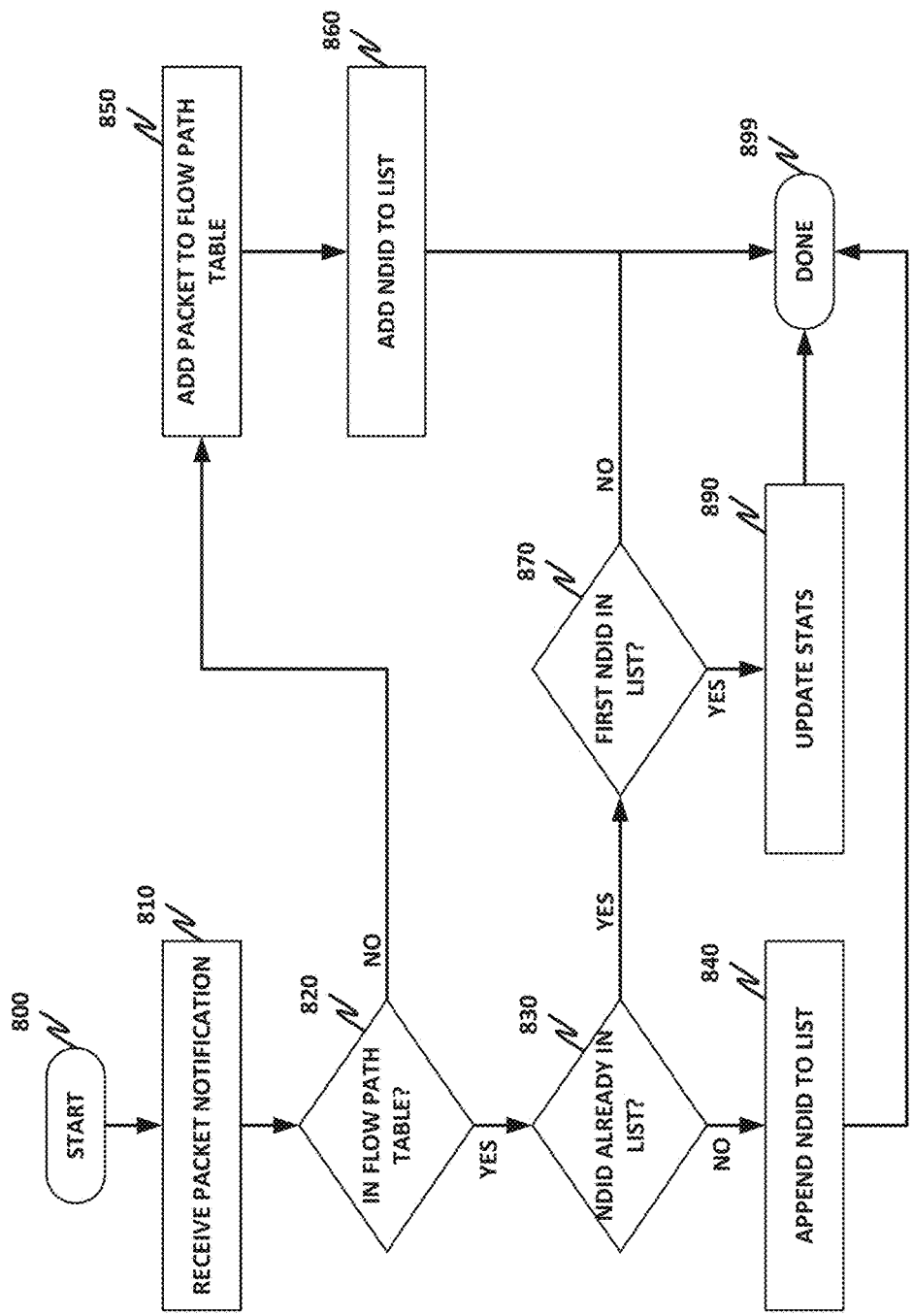
FIG. 8 is a flow chart of a method performed by an SDN controller according to one or more examples of the present specification.

In an example, route tracing engine 324 provides the method of FIG. 8 or any other suitable method that enables tracing of network packets and data.

Server device 300 may also include an SDN engine 326. SDN engine 326 may be an engine as described in this specification, and may enable server device 300 to function as an SDN controller, such as SDN controller 410 of FIG. 4.

Figure 4:
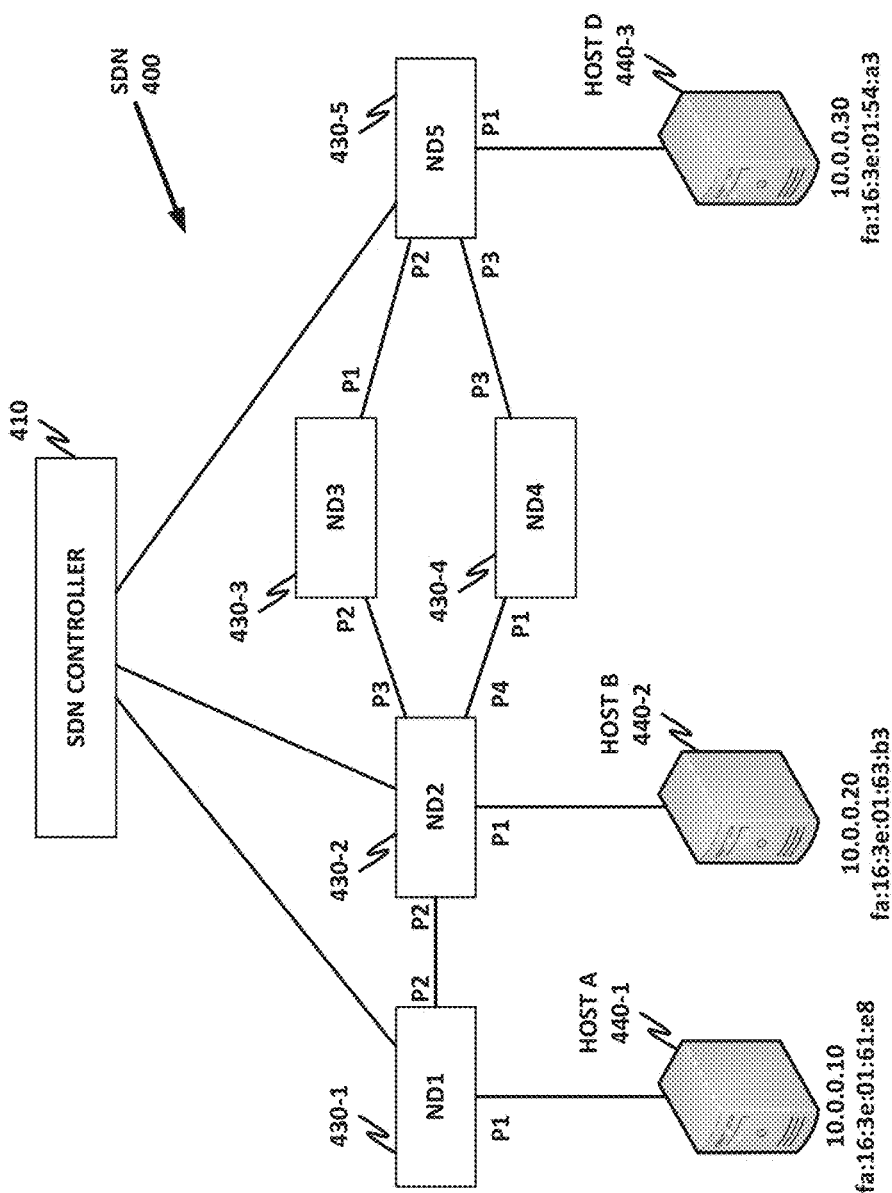
FIG. 4 is a block diagram of a network infrastructure according to one or more examples of the present specification.

FIG. 4 is a block diagram of a software-defined network 400. In some examples, the illustration of FIG. 4 may be more functional, while in comparison the illustration of FIG. 1 may be more of a physical or logical layout of the network. It should be understood, however, that SDN 400 and enterprise network 100 may be the same network, or may be separate networks.

SDN 400 may include an SDN controller 410, a plurality of network devices 430, and a plurality of host devices 440. Some or all of SDN controller 410, network devices 430, and host devices 440 may be embodied within workload cluster 142 of FIG. 1, or may otherwise form a part of enterprise network 170.

SDN 400 is controlled by an SDN controller 410. SDN controller 410 is communicatively coupled to a plurality of network devices 430. Specifically, ND1 430-1, ND2 430-2, and ND5 430-5 are directly communicatively coupled to SDN controller 410. Network devices and ND3 430-3 and ND4 430-4 are not directly coupled to SDN controller 410, but rather coupled via the intermediate devices, such as ND2 430-2, and ND5 430-5.

Some network devices 430 also communicatively couple directly to host devices 440. Specifically, network device ND1 directly couples to host A 440-1, which has IP address 10.0.0.10, and MAC address FA:16:3:01:61:8. Network device ND2 430-2 directly couples to host B 440-2, which has IP address 10.0.0.20, and MAC address FA:16:3:01:63:B3. Network device ND5 430-5 directly couples to host D 440-3, which has IP address 10.0.0.30, and MAC address FA:16:3:01:54:83.

Network devices 430 may be configured to perform a variety of network functions, such as by way of nonlimiting example, load-balancing, firewall, deep packet inspection (DPI), DNS, antivirus, or any other suitable network function. The particular arrangement of interconnections between network devices 430 and from network devices 430 to host devices 440 may be determined by the particular network configuration and needs. Thus, the specific configuration of FIG. 4 should be understood to be an illustrative example only.

Each network device 430 may have a plurality of ingress and or egress interfaces, such as physical Ethernet ports. In an example, each interface may have a label or new name, such as P1, P2, P3, P4, P5, and so on. Thus, certain aspects of the network layout can be determined by inspecting which devices are connected on which interface. For example, network device ND1 430-1 has an ingress interface for receiving instructions and communicating with SDN controller 410. ND1 430-1 also has an interface P1 communicatively coupled to host A 440-1. ND1 430-1 has interface P2 that is communicatively coupled to ND2 430-2. In the case of ND2 430-2, it also couples to ND1 430-1 on its own interface P2, and couples to host B 440-2 via interface P1. ND2 430-2 communicatively couples to intermediate devices ND3 430-3 and ND4 430-4 via interfaces P3 and P4 respectively. Additional interface definitions are visible throughout the figure.

A flow table may be defined for traffic as it flows from one interface to another. This flow table is used so that a network device, such as ND2 430-2 can determine, after receiving a packet, where to send it next.

For example, the following flow tables may be defined for ND1 430-1-ND4 430-4.

TABLE 1

ND1 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P2 |

TABLE 2

ND2 Flow Rule

| Ingress I/F | Source MAC | Destination Mac | Source IP | Dest. IP | Action |
|---|---|---|---|---|---|
| P2 | ANY | fa:16:3e:01:54:a3 | ANY | 10.0.0.30 | P4 |

TABLE 3

ND3 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P3 |

TABLE 4

ND4 Flow Rule

| Ingress I/F | Source MAC | Destination Mac | Source IP | Dest. IP | Action |
|---|---|---|---|---|---|
| P3 | ANY | fa:16:3e:01:54:a3 | ANY | 10.0.0.30 | P1 |

The foregoing flow tables may be deemed "wildcard" tables. Each of the foregoing table matches "ANY" source MAC, and "ANY" source IP, meaning that all incoming traffic on the designated ingress with the given destination MAC and IP will be provided to the designated egress ("Action") interface. Thus, it may be difficult to reconstruct the exact route a packet took ("traceroute") based on these flow tables.

For example, a traceroute may be performed on the following packet:
SRC_IP=10.0.0.1
SRC_MAC=fa:16:4d:05:55:a6
DEST_IP=10.0.0.30
DEST_MAC=fa:16:3e:01:54:a In this case, SDN controller 410 cannot trace the source network device, destination network device, or intermediate network devices.

However, the present specification provides an additional field that can be used to logically reconstruct a traceroute. In this example, a "Role Tag" is added to the flow table.

TABLE 5

Modified ND1 Flow Rule

| Ing. I/F | Source MAC | Destination Mac | Src IP | Dest. IP | Action | Role Tag |
|---|---|---|---|---|---|---|
| P1 | ANY | fa:16:3e:01:54:a3 | ANY | 10.0.0.30 | P2 | 1 |

In this case, ND1 430-1 is the source network device for this packet, and thus, when ND1 430-1 first encounters the packet, the role tag is set to "0." Thus, ND1 430-1 knows that it is the source network device (S) for this packet, and sets the role tag so that later network devices 430 do not believe that they are the source network device. ND1 430-1 then informs SDN controller 410 of its role as the source network device.

As the packet traverses the network through ND2 430-2 and ND4 430-4, they see that the role tag is set and thus leave the role tag alone. They inform SDN controller 410 that they are intermediate devices (I) for this packet.

ND5 is the destination device, as identified by the Dest. MAC and Dest. IP fields. When ND5 430-5 receives the packet, it clears or removes the role tag, and informs SDN controller 410 that it is the destination (D) network device for this packet.

SDN controller 410 may then keep a role table for the packet, as follows:

TABLE 6

Role Table

| Src MAC | Dest. MAC | Src IP | Dest. IP | Src | Dst. | Int. | Timeout |
|---|---|---|---|---|---|---|---|
| fa:16:3e:01:61:e8 | fa:16:3e:01:54:a3 | 10.0.0.10 | 10.0.0.30 | ND1 | ND5 | [ND2, ND4] | . . . |

Looking at this table, a network administrator (or device) can quickly determine that the end-to-end path for this packet is ND1-ND2-ND4-ND5.

Figure 5:
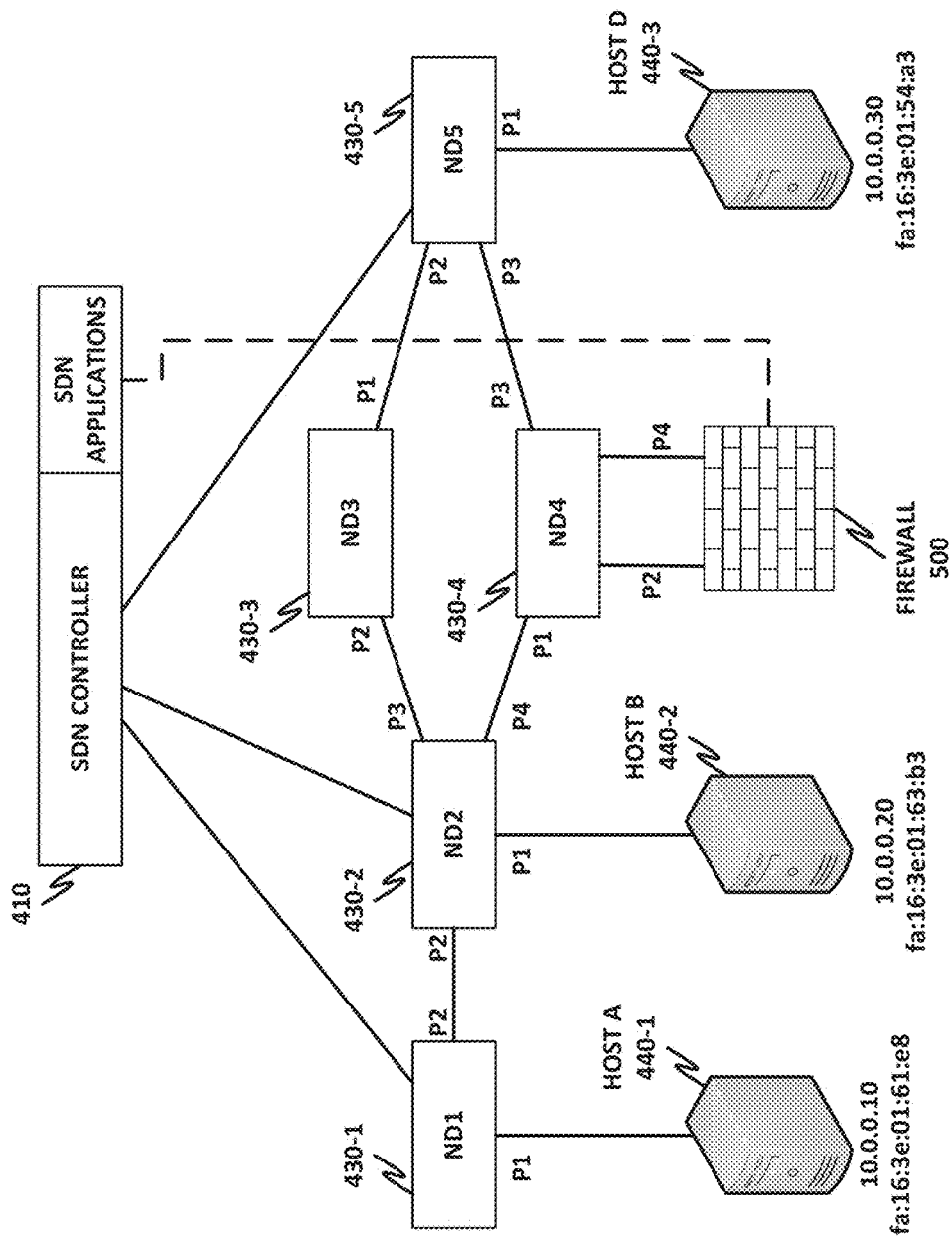
FIG. 5 is a block diagram of a network infrastructure according to one or more examples of the present specification.

FIG. 5 is a network block diagram disclosing an additional use case for the methods of the present specification. In this case, a firewall 500 has been added to the configuration.

In this case, assume that host A 440-1 wants to communicate with host D 440-3. The packet traverses the route ND1→ND2→ND4→Firewall→ND5. The following flow table entries may be in operation.

TABLE 7

Modified ND4 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P2 |
| P4 | ANY | fa:16:3e:01:54:a3 | ANY | 10.0.0.30 | P3 |

Assume now that firewall 500 reports to SDN controller 410 that the flow from host A 440-1 to host D 440-3 is malicious. In that case, SDN controller 410 may find it difficult to apply security policies at the optimal network location to block malicious traffic, because the flow entries are too similar to be useful to SDN controller 410.

However, it a role table is constructed, as illustrated in connection with FIG. 4, SDN controller 410 can easily identify the source network device as ND1. Knowing that ND1 is the source network device for this malicious packet, SDN controller 410 can block traffic from host A 440-1 to host D 440-3 at S ND1 430-1, rather than allowing the traffic to flow all the way to the firewall and be blocked there. This may increase network efficiency.

An example method for carrying out the foregoing operations is described in more detail in FIGS. 6a and 6b.

Certain embodiments may also work without the need for a role tag, as illustrated by the method of FIG. 7. For example, SDN controller 410 may install flow rules on a network device as follows:

TABLE 8

ND1 Flow Rule

| Ingress I/F | Source MAC | Destination Mac | Source IP | Dest. IP | Action |
|---|---|---|---|---|---|
| P1 | ANY | ANY | ANY | 10.0.0.30 | P2 |

Multiple packets from any source destined for 10.0.0.30 match the flow rule and are forwarded according to the rule. However, it may not be optimal for each network device to keep a separate entry for every packet matching this flow rule, as in a large data center, millions of packets may be handled on a daily basis. Thus, if SDN controller 410 installs the above flow rule in a device, it can be cumbersome to know a specific flow's statistics or end-to-end path.

However, if the source network device (S) notifies SDN controller 410 of the packet's arrival before performing a lookup, certain advantages can be realized. Specifically, an end-to-end path can be derived for the packet. Packet flow statistics, such as the number of packets, can be maintained on SDN controller 410, and queried as necessary. An analytical engine can also use the derived information to craft security policies for specific network devices. In another example, if a network device drops a packet (e.g., the packet does not reach its destination device), this can be discovered. And finally, malicious traffic can be blocked at the source network device instead of at a security appliance, thus allowing SDN controller 410 to intelligently handle malicious events. These are provided by way of nonlimiting example.

When a network device 430 notifies SDN controller 410 of the arrival of a packet, this may take the form of providing a packet header, network device ID, and input interface, before performing a lookup in the flow table (or routing table). This notification may be performed for all incoming packets, thus enabling SDN controller 410 to know the path of network devices that a packet passes through by constructing a flow path table for that packet.

This may be more efficient than requiring each network device 430 to maintain its own flow path table, as in many embodiments, SDN controller 410 has significantly greater resources than individual network devices 430.

By way of example, consider again SDN 400 of FIG. 4. Assume that the following flow tables are defined for the respective network devices.

TABLE 9

ND1 Flow Rule

| Ingress I/F | Source MAC | Destination Mac | Source IP | Dest. IP | Action |
|---|---|---|---|---|---|
| P1 | ANY | ANY | ANY | 10.0.0.30 | P2 |

TABLE 10

ND2 Flow Rule

| Ingress I/F | Source MAC | Destination Mac | Source IP | Dest. IP | Action |
|---|---|---|---|---|---|
| P2 | ANY | ANY | ANY | 10.0.0.30 | P4 |

TABLE 11

ND3 Flow Rule

| Ingress I/F | Source MAC | Destination Mac | Source IP | Dest. IP | Action |
|---|---|---|---|---|---|
| P1 | ANY | ANY | ANY | 10.0.0.30 | P3 |

TABLE 12

ND4 Flow Rule

| Ingress I/F | Source MAC | Destination Mac | Source IP | Dest. IP | Action |
|---|---|---|---|---|---|
| P3 | ANY | ANY | ANY | 10.0.0.30 | P1 |

In this case, traffic from any SRC IP or MAC will match the flow and be forwarded according to the rule. Assume that host A 440-1 wishes to communicate with host D 440-3. SDN controller 410 needs to perform a traceroute to reconstruct the network path of the following packet:

SRC_IP=10.0.0.1

SRC_MAC=fa:16:4d:05:55:a6

DEST_IP=10.0.0.30

DEST_MAC=fa:16:3e:01:54:a

Absent additional information SDN controller 410 cannot construct a definite route. However, according to the present method, when the packet hits ND1 430-1, ND1 430-1 sends its own ID, input interface, and the packet header to SDN controller 410. ND1 430-1 then looks up the flow rule for this packet.

SDN controller 410-1 now constructs a flow path table, as follows:

TABLE 13

| | | Flow Path Table | | | |
|---|---|---|---|---|---|
| Src MAC | Dest. MAC | Src. IP | Dest. IP | ND Lst | Flow Stats (in bytes) |
| fa:16:3e:01:61:e8 | fa:16:3e:01:54:a3 | 10.0.0.10 | 10.0.0.30 | ND1 | 1600 |

ND1 430-1 then forwards the packet to ND2 430-2, according to the flow rule. When ND2 receives the packet, ND2 430-2 sends its input interface, network device ID, and packet header to SDN controller 410. SDN controller 410 now updates the flow path table and appends ND2 to its list of network devices.

TABLE 14

| | | Flow Path Table | | | |
|---|---|---|---|---|---|
| Src MAC | Dest. MAC | Src. IP | Dest. IP | ND Lst | Flow Stats (in bytes) |
| fa:16:3e:01:61:e8 | fa:16:3e:01:54:a3 | 10.0.0.10 | 10.0.0.30 | ND1→ND2 | 1600 |

Similarly, as the packet traverses ND4 430-4 and ND5 430-5 respectively, they also notify SDN controller 410, and SDN controller 410 updates the flow path table. After traversing ND5 430-5, the flow path table is as follows:

TABLE 15

| | | Flow Path Table | | | |
|---|---|---|---|---|---|
| Src MAC | Dest. MAC | Src. IP | Dest. IP | ND Lst | Flow Stats (in bytes) |
| fa:16:3e:01:61:e8 | fa:16:3e:01:54:a3 | 10.0.0.10 | 10.0.0.30 | ND1→ND2→ND4→ND5 | 1600 |

Finally, the packet is forwarded to host D 440-3, its final destination.

Now, by simply inspecting the flow path table, SDN controller 410 can determine that the end-to-end flow path of the packet is ND1→ND2→ND4→ND5. It may also determine that the flow statistics are 1,600 bytes, and the flow is active (i.e., it has not timed out).

In certain embodiments, this method can be implemented without the need for a "role tag" field, as in the previous example. In other embodiments, the foregoing may be implemented in conjunction with a role tag field. For example, traffic may be divided into two or more classes, with one or more classes tracked via a role tag field, and one or more classes tracked via a flow path table maintained by SDN controller 410.

This method is illustrated in additional detail in the flow chart of FIG. 7.

FIGS. 6A and 6B are a flowchart of a method 600 performed by a software defined network according to one or more examples of the present specification.

To summarize the method, when a network device 430 receives a packet, the network device checks to see whether it is the source device for the packet. If so, it checks whether there is an entry for this packet in the flow table. If there is no entry, then it adds an entry for this packet, and informs SDN controller 410 that this network device 430 is the source (S) for this packet. The device then adds a role tag, such as a one-bit role tag field, to the packet, and sets its value to. The source device then sends the packet to the next network device in the chain.

When the packet arrives at the next network device, with the role tag already set, the device ignores the role tag field and informs SDN controller 410 that this device is an intermediate (I) device. If no role tag is set in the packet, then the device forwards the packet per the flow rule (as this network device is not the source device for the packet).

When the packet reaches the destination (D) device, the destination device removes the role tag and informs SDN controller 410 that this device is the destination for this packet.

In greater detail, starting at block 600, a network device 430 receives an incoming packet.

In decision block 610, network device 430 determines whether it is the source network device for this packet.

In decision block 620, if network device 430 is the source (S) for this packet, then network device 430 checks whether there is an entry in the flow table for this packet.

If there is already an entry, then in block 624, network device 430 stores the packet on the network.

In block 630, network device 430 informs SDN controller 410 that network device 430 is the source device (S) for this packet. Network device 430 may also provide to SDN controller 410 any relevant statistics.

In block 640, network device 430 adds a role tag to the packet, and sets the role tag to "1."

In block 650, network device 430 forwards the packet to the next network device according to the flow table. Control then passes back to block 600, where network device 430 waits to receive a new packet.

Returning to decision block 620, if there if there is no entry in the flow table for this packet, then in block 680, network device 430 updates packet statistics on to SDN controller 410.

In block 690, network device 430 forwards the packet according to the flow table. In block 699, the method is done.

Returning now to decision block 610, if network device 430 is not the source device for this packet, then in block 614, network device 430 checks to determine whether the role tag is set.

If the role tag is not set, then following on-page connector 1, in block 690, network device 430 forwards the packet according to its flow table. In block 699, the method is done.

Returning to decision block 614, if the role tag is set, then in decision block 660, network device 430 checks to determine whether it is the destination for this packet. If the network device is not the destination for this packet, then in block 670, network device 430 informs SDN controller 410 that network device 430 is an intermediate (I) device for the flow for this packet. Then in block 690, network device 430 forwards the packet according to its flow table, and in block 699, the method is done.

Returning to decision block 660, if network device 430 is the destination network device for this packet, then control passes via off page connector to FIG. 6B.

On FIG. 6B, in block 662, network device 430 removes the role tag. This may comprise either completely removing the role tag field, or simply clearing the role tag.

In block 664, network device 430 informs SDN controller 410 that its role in this chain is destination (D).

Following off-page connector 3 back to FIG. 6A, in block 690, network device 430 forwards the packet according to its flow table. In block 699, the method is done.

FIGS. 7 and 8 are flow charts of a method performed by an SDN according to one or more examples of the present specification. In this example, a role bit may be unnecessary. The methods disclosed in FIGS. 7 and 8 may be used in addition to, in conjunction with, or instead of the method of FIGS. 6a and 6b.

In summary, each network device 430 is configured to receive an incoming packet. When the packet arrives, before (or optionally after) performing a lookup of the flow table, the network device 430 notifies SDN controller 410 of the input interface that the packet was received on, as well as additional information such as the network device ID (NDID) for the network device, and a packet header. After performing the notification, network device 430 may forward the packet normally.

In its turn, SDN controller 410 receives the notification, and adds an entry into its flow path table for that packet, indicating that network device 430 is in the path for that packet (see, e.g., Table 14 or Table 15). If an entry for the packet already exists in the flow table, SDN controller 410 checks to see whether there is already an entry for network device 430. If there is, and if network device 430 is the first device in the chain, then SDN controller 410 updates flow statistics as appropriate. SDN controller 410 may also reset an expiry timer with a timeout value selected so that SDN controller 410 can delete the flow entry if no traffic for that flow has been received for a reasonable time. This helps to ensure that the flow table does not become unmanageably large. This allows SDN controller 410 to know the end-to-end flow path of all recent flows, and keep data about these packets (including packet headers) in a centralized database. This alleviates the need to keep data about the packets, and packet statistics, at the individual network devices. Flow statistics, port statistics, and table statistics can be computed at SDN controller 410 using the flow path table.

In more detail, FIG. 7 is a flowchart of a method 700 performed by a network device 430 according to one or more examples of the present specification.

In block 710, network device 430 receives a new packet.

In block 720, network device 720 notifies SDN controller 410 that a packet has arrived. This may include providing to SDN controller 410 an input interface, network device ID, and packet header to SDN controller 410, by way of nonlimiting example.

In block 730, network device 430 performs its flow table lookup.

In block 740, network device 430 forwards the packet to the next device in the chain per the flow table.

In block 799, the method is done.

FIG. 8 is a flowchart of a method 800 performed by SDN controller 410 in connection with a method performed by network device 430 in FIG. 7.

At block 810, SDN controller 410 receives from network device 430 a packet notification. This may be, for example, the packet notification that network device 430 provided in block 720 of FIG. 7. This notification may include, by way of nonlimiting example, the input interface, network device ID, and packet header for the packet. The notification of block 810 and the notifications of blocks 630, 664, and 670 of FIGS. 6A and 6B may be generically referred to as logging actions.

In block 820, SDN controller 410 determines whether there is currently an entry for the packet in the flow path table.

If the entry is not in the flow path table, then in block 850, SDN controller 410 adds an entry for the packet to the flow path table.

In block 860, SDN controller 410 adds the network device ID for network device 430 to the list, as illustrated in Table 14 and Table 15 above. Then in block 899, the method is done.

Returning to decision block 820, if an entry for the packet is already in the flow path table, then in decision block 830, SDN controller 410 determines whether the network device ID for network device 430 is already in the list.

In block 840, if the network device ID for network device 430 is not already in the list, then SDN controller 410 adds the network device ID for network device 430 to the list. In block 899, the method is done.

Returning to decision block 830, if the network device ID for network device 430 is already in the list, then in block 870, SDN controller 410 checks to see whether the network device ID for network device 430 is the first device in the list.

If it is not the first device nonetheless, then in block 899, the method is done.

If network device 430 is the first device in the list, then in block 890, SDN controller 410 updates statistics for this packet.

In block 899, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed by way of example, a computing apparatus, comprising: a network interface; and one or more logic elements comprising a flow table engine operable to: receive a network packet via the network interface; perform a logging action to make the network packet traceable; and notify a software-defined networking (SDN) controller of the logging action via the network interface.

There is further disclosed an example, further comprising second one or more logic elements comprising a network function engine to provide a network function.

There is further disclosed an example, wherein: inspecting the network packet comprises determining that the computing apparatus is a source of the network packet; and the logging action comprises setting a role tag.

There is further disclosed an example, wherein the role tag is a one-bit tag.

There is further disclosed an example, wherein: inspecting the network packet comprises inspecting a source flow key; and the logging action comprises adding the source flow key to a flow path table.

There is further disclosed an example, wherein the source flow key comprises an internet protocol (IP) address or a media access control (MAC) address.

There is further disclosed in an example, a computing apparatus, comprising: a network interface; first one or more logic elements comprising a software-defined networking (SDN) controller engine to provide SDN controller services; and second one or more logic elements comprising a route tracing engine, operable to: receive a logging action for a network packet from a network device via the network interface; and update a logging table from the logging action.

There is further disclosed an example, wherein the route tracing engine is further operable to receive a route tracing request for the network packet, and to generate a route for the network packet.

There is further disclosed an example, wherein the logging table comprises a flow path table, and wherein generating a route for the network packet comprises looking up a flow key tuple for the packet, and retrieving a network device list.

There is further disclosed an example, wherein the flow key tuple is hashed.

There is further disclosed an example, wherein the logging table comprises a flow tag bit, and wherein populating the flow path table comprises: populating a source field of a device chain; receiving a notification of an intermediate device; adding the intermediate device to the device chain; determining that a terminal device matches a destination of the network packet; and terminating the device chain.

There is further disclosed an example, wherein terminating the device chain comprises populating a destination field of the device chain.

There is further disclosed an example of one or more tangible, non-transitory computer-readable storage mediums having stored thereon executable instructions for instructing one or more processors for providing one or more of the engines engine described above, or for performing any or all of the operations of the preceding examples.

There is further disclosed an example of a method of providing comprising performing any or all of the operations of one or more of the engines in any of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
a network interface;
first one or more logic elements comprising a network function engine to provide a network function; and
second one or more logic elements comprising a flow table engine operable to:
receive a network packet via the network interface;
perform a logging action to make the network packet traceable, the logging action comprising:
inspecting a role tag of the packet, and determining that the network function has a role selected from a source device, an intermediate device, or a destination device based at least in part on the role tag; and
notify a software-defined networking (SDN) controller of the role via the network interface.

2. The computing apparatus of claim 1, wherein:
determining that the network function has a role as a source device comprises determining that the role tag is not set; and
the logging action comprises setting the role tag.

3. The computing apparatus of claim 2, wherein the role tag is a one-bit tag.

4. The computing apparatus of claim 1, wherein:
the flow table engine is further configured to inspect a source flow key; and
notifying the SDN controller of the role comprises adding the source flow key to a flow path table.

5. The computing apparatus of claim 4, wherein the source flow key comprises an internet protocol (IP) address or a media access control (MAC) address.

6. The computing apparatus of claim 1, wherein determining that the network function has a role as an intermediate device comprises determining that the role tag is set, and that the network function is not a destination of the network packet.

7. The computing apparatus of claim 1, wherein determining that the network function has a role as a destination device comprises determining that the role tag is set, and that the network function is a destination for the packet, and wherein the flow table engine is further to unset the role tag.

8. A computing apparatus, comprising:
a network interface;
first one or more logic elements comprising a software-defined networking (SDN) controller engine to provide SDN controller services; and second one or more logic elements comprising a route tracing engine, operable to:
  receive a logging action for a network packet from a network function via the network interface, wherein the logging action comprises a notification from the network function that the network function is one of a source device, an intermediate device, or a destination device; and
  update a logging table from the logging action.

9. The computing apparatus of claim 8, wherein the route tracing engine is further operable to receive a route tracing request for the network packet, and to generate a route for the network packet.

10. The computing apparatus of claim 9, wherein the logging table comprises a flow path table, and wherein generating a route for the network packet comprises looking up a flow key tuple for the packet, and retrieving a network device list.

11. The computing apparatus of claim 10, wherein the flow key tuple is hashed.

12. The computing apparatus of claim 8, wherein the logging table comprises a flow path table, and wherein populating the flow path table comprises:
  populating a source field of a device chain;
  receiving a notification of an intermediate device;
  adding the intermediate device to the device chain;
  determining that a terminal device matches a destination of the network packet; and
  terminating the device chain.

13. The computing apparatus of claim 12, wherein terminating the device chain comprises populating a destination field of the device chain.

14. One or more tangible, non-transitory computer-readable storage mediums having stored thereon executable instructions to instruct a processor to:
  receive a network packet via a network interface;
  perform a logging action to make the network packet traceable, the logging action comprising:
  inspecting a role tag of the packet, and determining that the network function has a role selected from a source device, an intermediate device, or a destination device based at least in part on the role tag; and
  notify a software-defined networking (SDN) controller of the role via the network interface.

15. The one or more tangible, non-transitory computer-readable mediums of claim 14, wherein the instructions are further to instruct the processor to provide a network function.

16. The one or more tangible, non-transitory computer-readable mediums of claim 15, wherein:
  determining that the network function has a role as a source device comprises determining that the role tag is not set; and
  the logging action comprises setting the role tag.

17. The one or more tangible, non-transitory computer-readable mediums of claim 16, wherein the role tag is a one-bit tag.

18. The one or more tangible, non-transitory computer-readable mediums of claim 14, wherein:
  the flow table engine is further configured to inspect a source flow key; and
  notifying the SDN controller of the role comprises adding the source flow key to a flow path table.

19. The one or more tangible, non-transitory computer-readable mediums of claim 18, wherein the source flow key comprises an internet protocol (IP) address or a media access control (MAC) address.

20. The one or more tangible, non-transitory computer-readable mediums of claim 19, wherein the logging table comprises a flow path table, and wherein populating the flow path table comprises:
  populating a source field of a device chain;
  receiving a notification of an intermediate device;
  adding the intermediate device to the device chain;
  determining that a terminal device matches a destination of the network packet; and
  terminating the device chain.

21. The one or more tangible non-transitory computer-readable mediums of claim 20, wherein terminating the device chain comprises populating a destination field of the device chain.

22. One or more tangible, non-transitory computer-readable storage mediums having stored thereon executable instructions to instruct a processor to:
  provide SDN controller services;
  receive a logging action for a network packet from a network device via a network interface, the logging action comprising:
  inspecting a role tag of the packet, and determining that the network function has a role selected from a source device, an intermediate device, or a destination device based at least in part on the role tag; and
  update a logging table from the logging action.

23. The one or more tangible non-transitory computer-readable mediums of claim 22, wherein the instructions are further operable to receive a route tracing request for the network packet, and to generate a route for the network packet.

24. The one or more tangible non-transitory computer-readable mediums of claim 23, wherein the logging table comprises a flow path table, and wherein generating a route for the network packet comprises looking up a flow key tuple for the packet, and retrieving a network device list.

25. The one or more tangible non-transitory computer-readable mediums of claim 23, wherein the flow key tuple is hashed.

* * * * *

UNITED STATES PATENT AND TRADEMARK OFFICE
CERTIFICATE OF CORRECTION

PATENT NO. : 9,917,775 B2  
APPLICATION NO. : 14/978604  
DATED : March 13, 2018  
INVENTOR(S) : Shivakrishna Anandam Mulka et al.

Page 1 of 1

It is certified that error appears in the above-identified patent and that said Letters Patent is hereby corrected as shown below:

In the Drawings

On sheet 2 of 9, in Figure 2, reference numeral 200, Line 1, delete "NTEWORK" and insert -- NETWORK --, therefor.

On sheet 6 of 9, in Figure 6a, reference numeral 680, Line 1, delete "UPDAT" and insert -- UPDATE --, therefor.

Signed and Sealed this
Twenty-sixth Day of June, 2018

Andrei Iancu
*Director of the United States Patent and Trademark Office*